United States Patent [19]

Takayama

[11] Patent Number: 5,091,896
[45] Date of Patent: Feb. 25, 1992

[54] METHOD AND APPARATUS FOR MAGNETO-OPTICAL RECORDING USING A DEMAGNETIZATION FIELD AND ERASING USING EXTERNAL MAGNETIC FIELD

[75] Inventor: Shinji Takayama, Mitaka, Japan

[73] Assignee: International Business Machines Corporation, Armonk, N.Y.

[21] Appl. No.: 594,514

[22] Filed: Oct. 9, 1990

[30] Foreign Application Priority Data

Oct. 13, 1989 [JP] Japan ................. 1-265308

[51] Int. Cl.⁵ .................. G11B 13/04; G11B 11/12
[52] U.S. Cl. ........................ 369/13; 360/59; 360/114; 365/122
[58] Field of Search .......... 369/13, 14; 360/59, 360/114; 365/122

[56] References Cited

U.S. PATENT DOCUMENTS

| | | | |
|---|---|---|---|
| 4,814,238 | 3/1989 | Tanaka et al. ................. | 369/13 |
| 4,882,718 | 11/1989 | Kryder et al. ................. | 365/122 |
| 4,888,750 | 12/1989 | Kryder et al. ................. | 365/122 |
| 4,926,402 | 5/1990 | Masakawa ................. | 369/13 |
| 4,944,037 | 7/1990 | Ando ................. | 369/13 |
| 4,995,024 | 2/1991 | Arimune et al. ................. | 365/122 |

FOREIGN PATENT DOCUMENTS 62-175948 8/1987 Japan .

OTHER PUBLICATIONS

Shieh et al., "Operating Margins for Magneto-Optic Recording Materials with Direct Overwrite Capability", IEEE Transactions, on Magnetics, vol. MAG-23, No. 1, Jan. 1987, pp. 171-173.

Takayama et al., "Magnetic and Magneto-Optical Properties of Tb-Fe-Co Amorphous Films", J. Appl. Phys. 61(7) Apr. 1, 1987, pp. 2610-2616.

Primary Examiner—Stuart S. Levy
Assistant Examiner—Hoa Nguyen
Attorney, Agent, or Firm—Douglas R. Millett

[57] ABSTRACT

A method and an apparatus for MO recording that allow real overwrite by light power modulation with a combination of a storage medium consisting of a single-layer RE-TM film and a single-laser source. The medium has a Curie temperature not less than about 500° C. and has high saturation magnetization around 200° C. The coercive force drops to a level that allows the magnetization to be reversed by the demagnetization field at around 200° C.

16 Claims, 5 Drawing Sheets

A

B

C

D

METHOD AND APPARATUS FOR MAGNETO-OPTICAL RECORDING USING A DEMAGNETIZATION FIELD AND ERASING USING EXTERNAL MAGNETIC FIELD

BACKGROUND OF THE INVENTION

1. Field of the Invention

This invention relates to magneto-optical (MO) recording, which enables information to be written and erased by the use of a laser beam, and specifically, to an overwritable MO recording method and an apparatus using a single-beam source.

2. Description of the Prior art

MO recording has been put to practical use through a rewritable optical recording approach. MO recording can be classified into two categories, namely the field modulation recording method and the light power modulation recording method.

The field modulation recording method permits overwriting to be done easily by the use of a single-beam source, but has the problem that its mechanism becomes complex due to the need for a magnetic head which moves in synchronization with the laser beam. On the other hand, the light power modulation method requires no magnetic head, but has the problem that overwriting cannot be performed easily with a single-beam source.

Several studies have been done on ways to overcome the latter problem. The explanation given below is based on two examples. First, JA PUPA (published unexamined patent application) 62-175948 discloses the use of a double-layer film, emission of a high-power laser beam for writing, and emission of a lower-power laser beam for erasing. However, this approach has the problem that the mechanism becomes complex because it requires means for applying a strong initial bias field for erasing as well as means for an external bias field for writing. In addition, it is complicated to prepare a medium with two layers whose properties are well adjusted.

Hang-Ping D.Shieh et al., "Operating Margins for Magneto-Optic Recording Materials with Direct Overwrite Capability", IEEE Transactions on Magnetics, Vol. MAG-23, No. 1, January 1987 discloses the following method:

(1) An RE(rare-earth)-rich RE-TM(rare-earth-transition-metal) amorphous film with a compensation temperature not less than 40° C. and not exceeding 130° C. is used as a recording film.
(2) A long pulse of 100 to 400 nsec is used for writing, and a short pulse of 25 to 80 nsec for erasing.

The principle of writing and erasing is explained with reference to FIGS. 6 and 7. FIG. 6 shows schematically the properties of an RE-TM film with a compensation temperature higher than room temperature. As the temperature increases, the coercive force (Hc) of the RE-TM film decreases monotonically in the temperature region above the compensation temperature Tcomp, while the saturation magnetization (Ms) first increases monotonically, then decreases monotonically, as shown in the figure. In the temperature region X of FIG. 6, the coercive force Hc is low, but the saturation magnetization Ms is still high, so that the demagnetizing field Ms is also high. Therefore, the demagnetizing field may reverse the magnetization of the RE-TM film. It appears that Shieh et al. have ensured that the magnetization of the RE-TM film with property (1) is reversed by the demagnetizing field when the film is heated to temperature region X.

The main features of the method disclosed by Shieh et al. are that the demagnetizing field generated by the magnetized RE-TM film itself is utilized, and that no external field is applied. Details of the write and erasure steps are given below.

First, it is assumed that the RE-TM film is magnetized initially in an upward direction. The upward magnetization corresponds to storage of "0" and the downward magnetization to storage of "1". In this example, write means reversing the direction of magnetization from upward to downward while erasure means reversing it again from downward to upward.

Pulse L, whose duration is 100 to 400 ns, longer than that of the laser pulse L' used later for erasing, is emitted to the RE-TM film for writing (FIG. 7A). As a result, the magnetization of region P irradiated by laser pulse L is reversed by demagnetizing the H' field which is generated by the surroundings, so that "1" is written (FIG. 7B).

Next, pulse L', whose duration is short (25 to 80 ns), is emitted to the center Q of domain P (FIG. 7C). As a result, the magnetization of region Q is reversed again by demagnetizing the field H" generated by the surroundings. Furthermore, the re-reversed domain expands (FIG. 7D) and the magnetization of the whole of domain P is finally re-reversed. Thus erasure is completed (FIG. 7E).

This method has the merit that no external field needs to be applied, but involves the following problems:

(a) Short pulses have to be emitted inside the written domains. Therefore, the medium has to be turned one extra time in order to locate the written domains before the erasure step. This is not overwriting in the strict sense of the word.
(b) Written domains become large because they are formed with long pulses. Therefore, the recording density cannot be increased.

SUMMARY OF THE INVENTION

One object of the invention is to provide a method and an apparatus for MO recording which allow real overwrite by light power modulation with a combination of a storage medium consisting of a single-layer RE-TM film and a single-laser source.

Another object of the invention is to provide a method and an apparatus for overwritable MO recording by light power modulation with a simple mechanism and with high recording density.

The inventor has found that the magnetization reversal by the demagnetizing field is a phenomenon that occurs naturally in RE-TM films with high saturation magnetization Ms even when the coercive force becomes sufficiently small at the time of heating, and that a combination of such films and a novel recording approach makes it possible to overwrite without causing the above problems.

The preferable recording medium has a Curie temperature not less than [about] 300° C. In other words, it has a sufficiently high saturation magnetization Ms, around 200° C. Another required property is that the coercive force Hc drops to a level that allows the magnetization to be reversed, because of the demagnetizing field. It is sufficient if the coercive force is 500 Oe or less at 200° C. If those properties are satisfied, the composition of the recording medium can be either on the TM-rich side, where the sublattice magnetization of transition-metals is predominant, or on the RE-rich side, where the sublattice magnetization of the rare-earth metals is predominant. TM-rich RE-TM single-layer films are already known. For example, S. Takayama et al. disclose some examples of them in "Magnetic and magneto-optical properties of Tb-Fe-Co amorphous films", J. Appl. Phys. 61 (7), 1 Apr. 1987. However, overwriting with such films by the light power modulation recording method has never been achieved. The proposed invention makes it possible to overwrite by using a TM-rich RE-TM single-layer film.

The whole of an RE-TM film is magnetized in the "0" direction before the recording steps. The recording method is to heat the film under a bias field to an appropriate temperature under the Curie temperature Tc, where the coercive force Hc drops sufficiently but the saturation magnetization Ms is still high enough for writing. For erasure, it is heated to a temperature near or above the Curie temperature Tc. Therefore, if a single-laser beam source is used, its power level is set highest for erasure, low for writing, and much lower for reading when magnetization reversal is not required.

For a fuller understanding of the nature and advantages of the present invention, reference should be made to the following detailed description taken in conjunction with the accompanying drawings.

DESCRIPTION OF THE PREFERRED EMBODIMENTS

Figure 1:
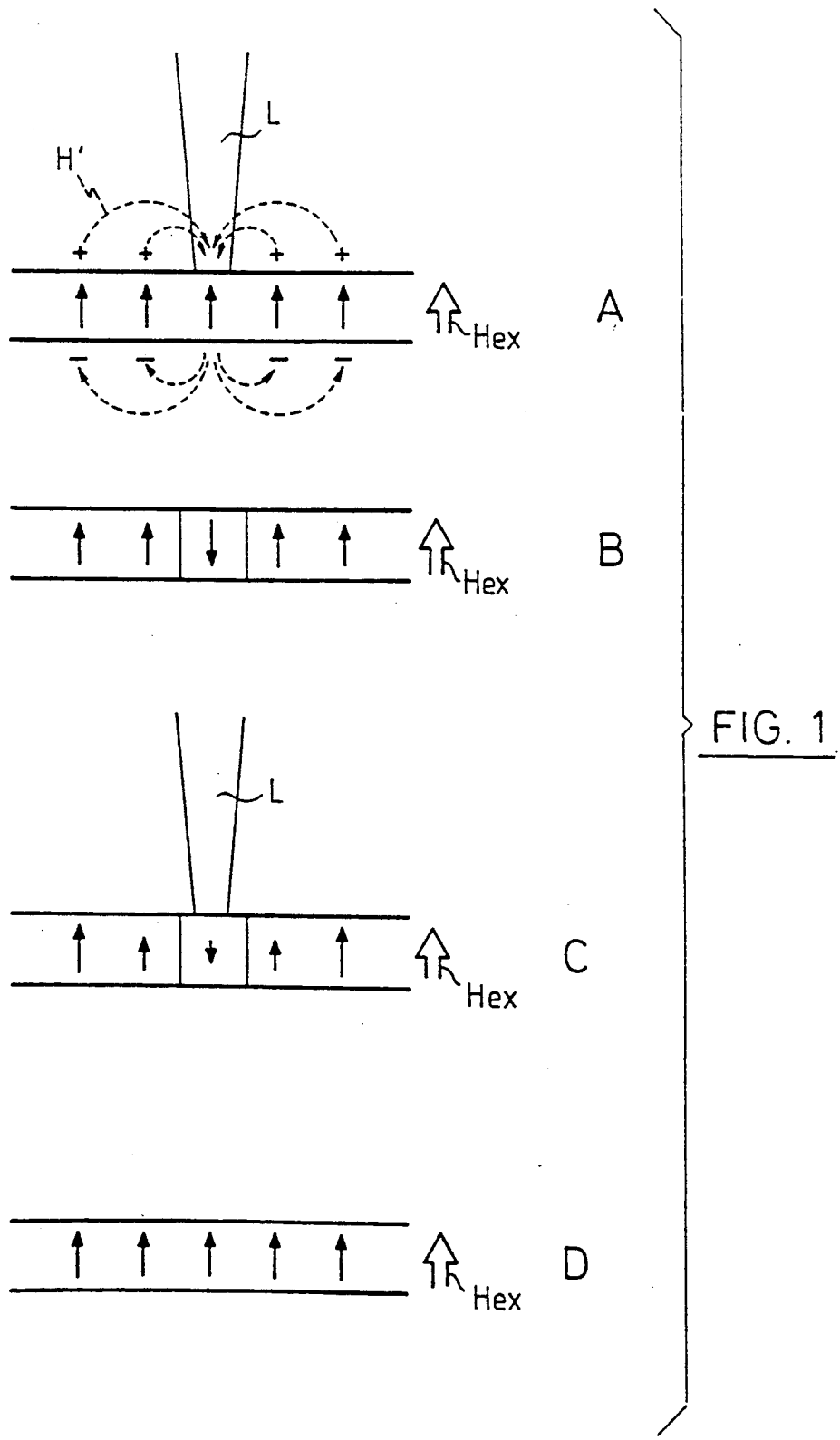
FIG. 1 shows the write and erasure steps of the invention.
Figure 7:
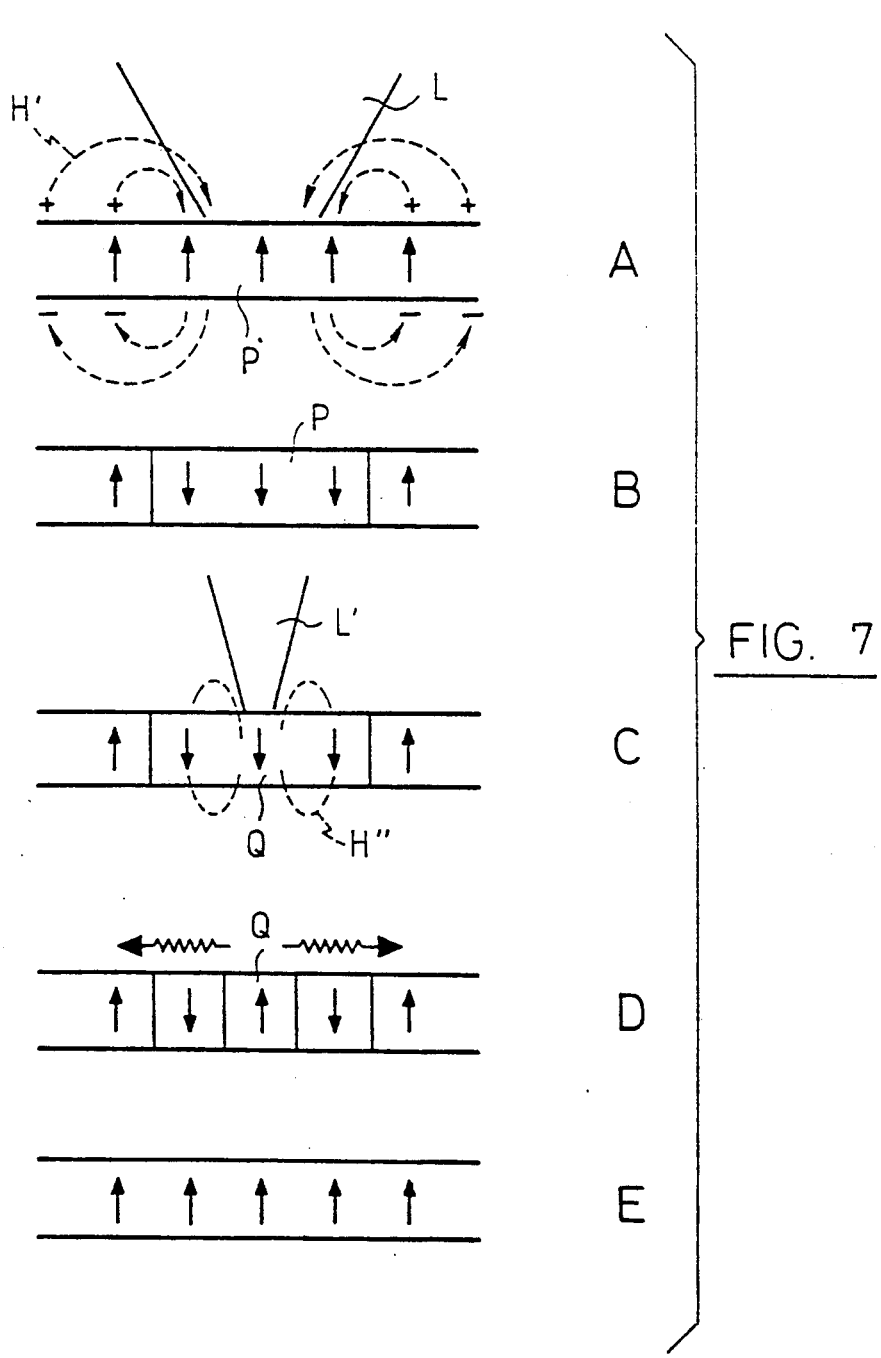
FIG. 7 shows a series of steps of the MO recording method in the prior art using an RE-TM single-layer film.

FIG. 1 illustrates the recording method in accordance with the invention by contrasting it with the prior method disclosed by Shieh et al., which was mentioned with reference to FIG. 7. First, the writing step is performed by emitting laser beam L with the first power level (FIG. 1A). Since the bias field Hex is weak, the magnetization of the heated spot is reversed by the sufficiently strong demagnetizing field H' generated by the spot itself and the surroundings (FIG. 1B). Next, the erasure step is performed by emitting of laser beam L with a second power level higher than the first power level (FIG. 1C). Because the film is heated to a temperature near or higher than the Curie temperature, the bias field Hex, although weak, reverses the magnetization again (FIG. 1D).

If a laser beam with the first power level is emitted as shown in FIG. 1B, where "1" has been written, the magnetization direction of the irradiated domain remains "1", because it becomes parallel to the direction of the demagnetizing field H' which is still high.

If the laser beam with the second power level is emitted as shown in FIG. 1D, where "0" has been written, the magnetization direction of the irradiated domain remains "0", because the magnetization of the surroundings drops and the demagnetizing field Hex works.

The main features of the invention can be understood from the above descriptions. However, the details of the principle of the invention are still incompletely understood, and therefore the explanation with reference to FIG. 1 contain some speculation.

In accordance with the invention, the recording density can be improved, because laser beam spots for writing or erasing one bit of information can be made small.

Erasure is possible with the aid of the bias field, even if the erasure beam doesn't overlap the written spot exactly. As a result, it becomes unnecessary to locate written domains before the erasure beam is emitted, which makes real overwrite feasible.

Figure 2:
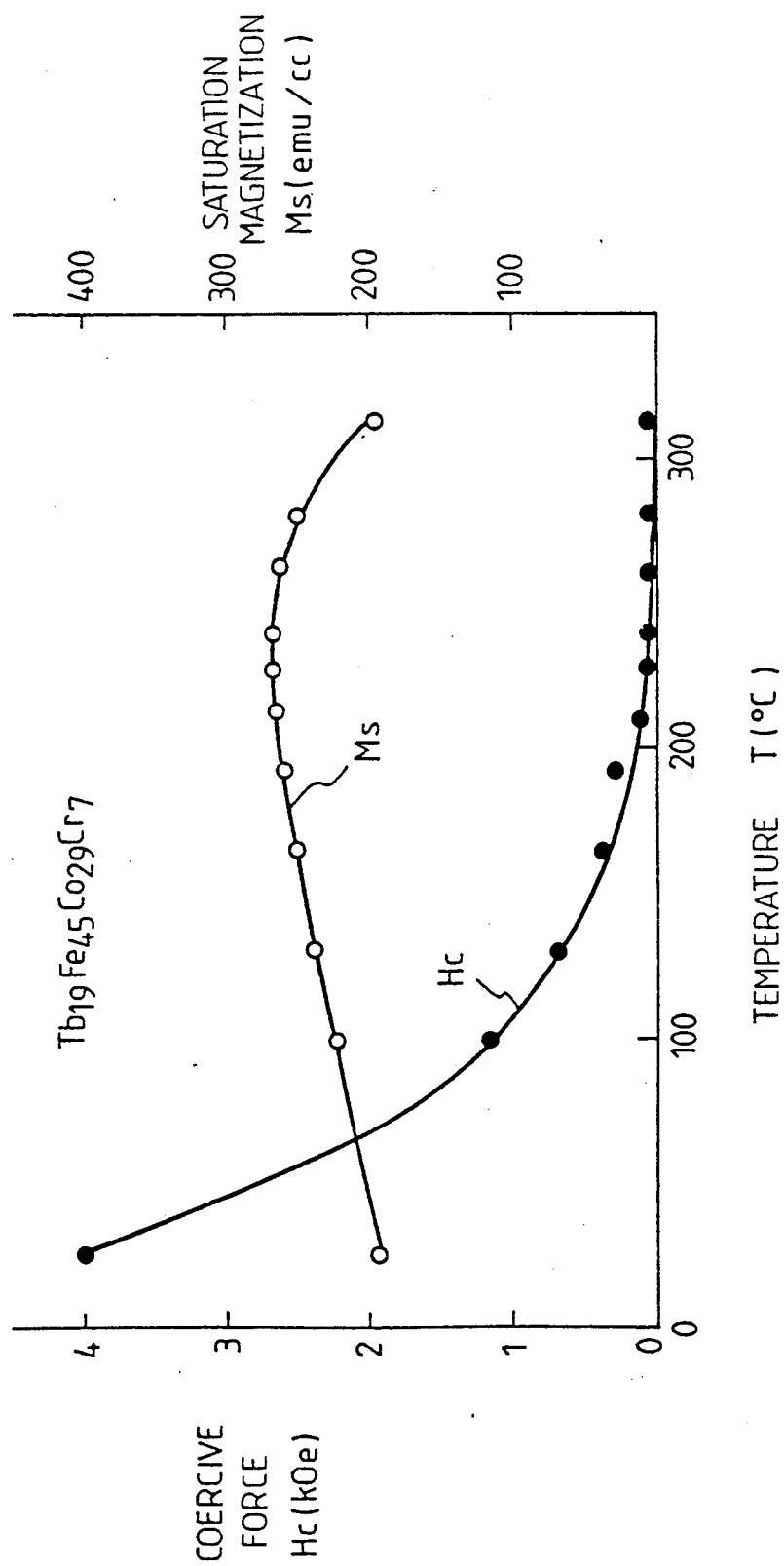
FIG. 2 is a graph showing the coercive force dependence of $Tb_{19}Fe_{45}Co_{29}Cr_7$ on the temperature.

Details of an experiment made by the inventor are given below for one composition. A TM-rich RE-TM film whose composition was $Tb_{19}Fe_{45}Co_{29}Cr_7$ was formed on a five-inch glass substrate by the DC magnetron sputtering method. FIG. 2 shows the dependence of the coercive force Hc and the saturation magnetization Ms on the temperature. As seen in the figure, the Curie temperature Tc of the film exceeded 300° C. and the coercive force at temperatures over 200° C. was less than 500 Oe.

Figure 3:
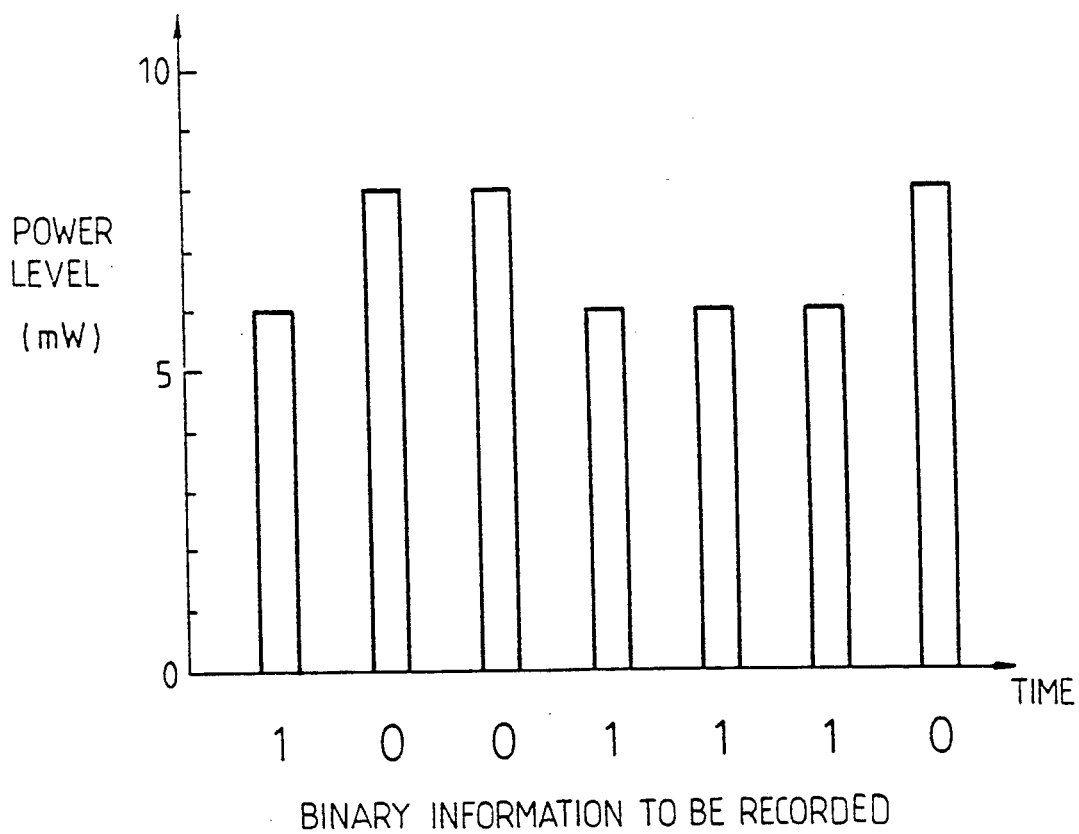
FIG. 3 is a graph showing one example of modulating the power level of laser beams.
Figure 4:
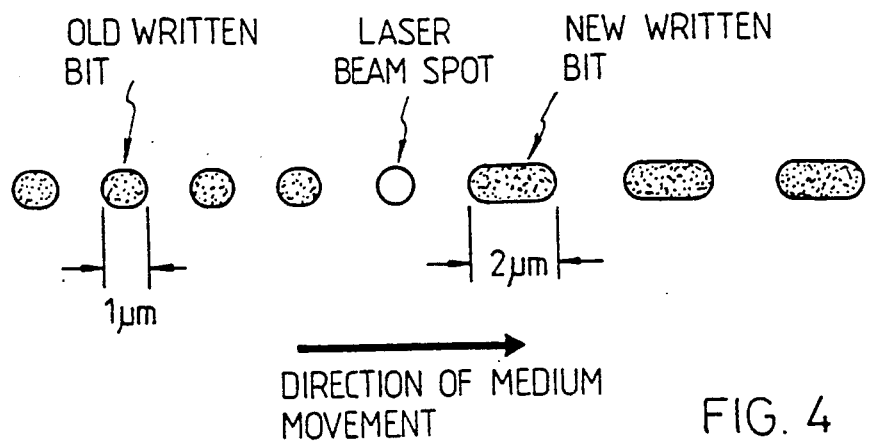
FIG. 4 shows bits on the storage medium written in accordance with the invention.

A semiconductor laser beam with a wavelength of 822 nm was directed onto a recording medium moving at a linear velocity of 9 m/sec. As shown in FIG. 3, when the laser spot was over the region where the information was to be recorded, the power was modulated between the write level, higher than the read level, and a much higher erasure level. The power level was set at 1.5 mW for reading, 6 mW for writing, and 8 mW for erasing. Further, a bias field of 100 Oe was applied at the position hit by the laser beam spot. FIG. 4 shows the appearance of the written bits formed in this way. It was found that bits of arbitrary size can be written and erased in accordance with the invention, as can be seen from the figure.

Table 1 shows compositions on the TM-rich side, which were found to be overwritable in the same situation as above. Table 2 shows compositions on the RE-rich side, which were also found to be overwritable in the same situation. The values of the coercive force in the tables were measured at room temperature.

TABLE 1

| TM-rich compositions found to be overwritable | | |
|---|---|---|
| Composition | Coercive force, Hc (KOe) | Curie temperature Tc (°C.) |
| $Tb_{17}Fe_{65}Co_{18}$ | 2 | 400 |
| $Tb_{18}Gd_2Fe_{60}Co_{20}$ | 4 | 380 |
| $Tb_{19}Nd_2Fe_{49}Co_{30}$ | 3 | 450 |
| $Tb_{18}Dy_2Fe_{62}Co_{18}$ | 5 | 330 |
| $Tb_{19}Fe_{45}Co_{30}Nb_6$ | 5 | 350 |
| $Tb_{19}Fe_{45}Co_{29}Cr_7$ | 4 | 400 |
| $Tb_{19}Fe_{45}Co_{29}Ta_7$ | 3 | 300 |
| $Tb_{18}Pr_5Fe_{45}Co_{32}$ | 3 | 400 |
| $Dy_{20}Fe_{52}Co_{28}$ | 2 | 350 |

TABLE 2

| RE-rich compositions found to be overwritable | | | |
|---|---|---|---|
|  | Coercive force, Hc (KOe) | Compensation temperature Tcomp (°C.) | Curie temperature Tc (°C.) |
| $Tb_{28}Fe_{43}Co_{29}$ | 3 | 150 | 400 |

TABLE 2-continued

RE-rich compositions found to be overwritable

| | Coercive force, Hc (KOe) | Compensation temperature Tcomp (°C.) | Curie temperature Tc (°C.) |
|---|---|---|---|
| $Tb_{25}Fe_{57}Co_{18}$ | 5 | 100 | 300 |
| $Tb_{23}Gd_5Fe_{47}Co_{25}$ | 3 | 100 | 400 |
| $Tb_{26}Dy_2Fe_{43}Co_{29}$ | 2 | 100 | 350 |
| $Tb_{25}Fe_{55}Co_{18}Cr_2$ | 3 | 120 | 350 |

Here, Nb, Cr, and Ta are transition-metal elements that were added to increase the corrosion resistance. They can be replaced with other elements that can achieve the same purpose, such as Ti and Pt.

Figure 5:
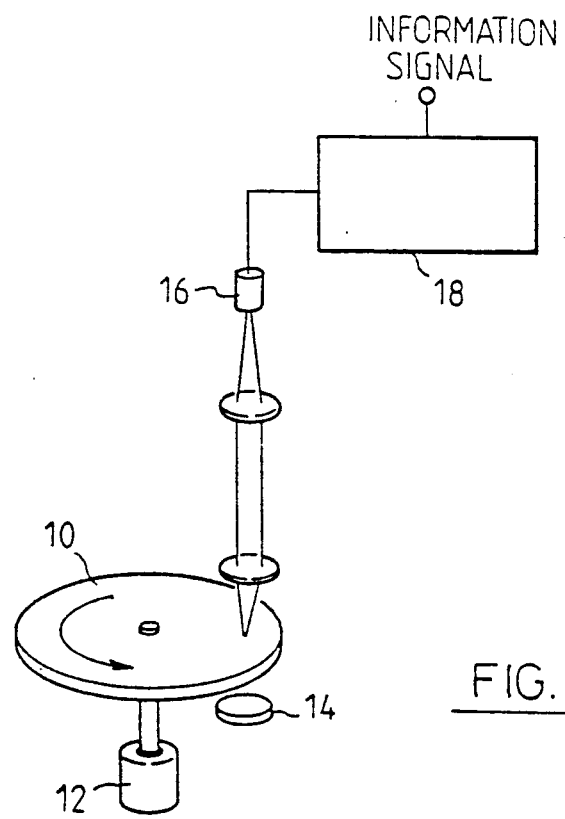
FIG. 5 is a block diagram showing an MO recording apparatus in accordance with the invention.
Figure 6:
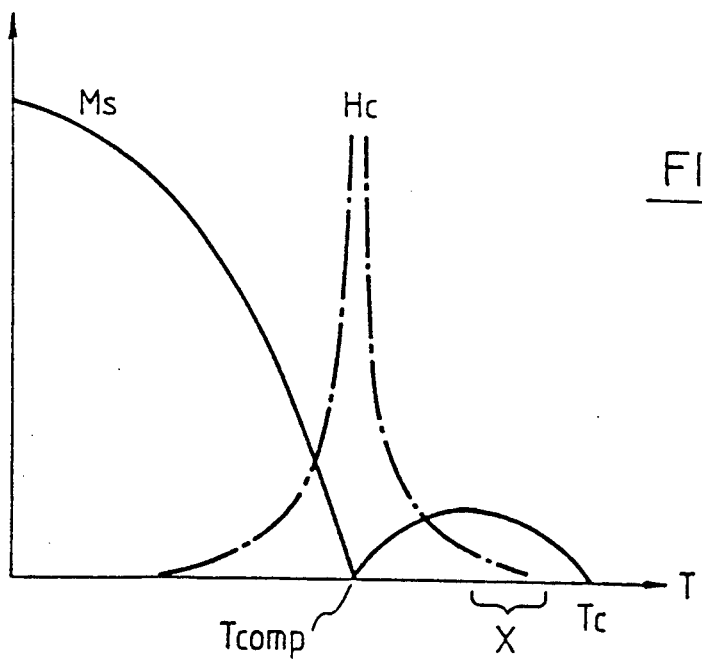
FIG. 6 is a graph showing the coercive force and saturation magnetization dependence of RE-TM film with Tcomp on the temperature generally.

FIG. 5 is a block diagram that gives an overview of the MO recording apparatus.

This apparatus has a rotation means (12) as one example of a means of moving the recording medium (10), a means of applying a bias field (14), a laser beam source (16), and a modulator (18) of pulses to the first level, suitable for writing, or to the second level, suitable for erasing. Of course a known optical system can exist between a laser beam source (16) and a recording medium (12). An electromagnet or, preferably, a permanent magnet can be used as a means of applying a bias field (14).

A laser beam source (16), for instance, can be used for initial magnetization of the recording medium by irradiating it with the second power level continuously.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for overwriteable magneto-optical recording comprising the steps of:
    using a recording medium made of a rare-earth-transition-metal (RE-TM) amorphous recording medium having high magnetization saturation and coercive force reduced to a level at which the direction of magnetization of a heated region becomes parallel to the direction of a demagnetization field from the medium when the region is heated to a temperature less than a Curie temperature of the medium but greater than a compensation temperature of the medium;
    directing an external magnetic field having a first direction at the medium, the external magnetic field being weaker than the demagnetization field when the medium is heated to a temperature less than the Curie temperature and greater than the compensation temperature;
    using a laser emission means to radiate a first data modulated laser beam of power sufficient to heat a first region of the medium to said temperature less than the Curie temperature and greater than the compensation temperature, such that the first region has a magnetization aligned in the direction of the demagnetization field and opposite to that of the external magnetic field;
    using said laser emission means to radiate a second data modulated laser beam of power sufficient to heat said first region of the medium to a temperature greater than the Curie temperature such that said first region has a magnetization aligned in the direction of the external magnetic field and opposite to that of the demagnetization field; and
    moving the medium relative to the first and second laser beams.

2. A method in accordance with claim 1, wherein the Curie temperature equals or exceeds 300° C.

3. A method in accordance with claim 1, wherein said medium is a RE-TM film whose coercive force drops to about 50 Oe and below when heated to 200° C. and over.

4. A method in accordance with claim 1, wherein said RE-TM film is a TM-rich RE-TM film.

5. A method in accordance with claim 1, wherein said RE-TM film is a RE-rich RE-TM film.

6. A method in accordance with claim 1, wherein said medium is a single layer film.

7. A method in accordance with claim 1, wherein said laser emission means comprises a single laser power source.

8. A method in accordance with claim 1, wherein the recording medium is initially magnetized in a first direction.

9. An apparatus for overwriteable magneto-optical recording comprising:
    a recording medium made of a rare-earth-transition-metal (RE-TM) amorphous recording medium having high magnetization saturation and coercive force reduced to a level at which the direction of magnetization of a heated region becomes parallel to the direction of a demagnetization field from the medium when the region is heated to a temperature less than a Curie temperature of the medium but greater than a compensation temperature of the medium;
    means for generating an external magnetic field at the medium the external magnetic field being weaker than the demagnetization field when the medium is heated to a temperature less than the Curie temperature and greater than the compensation temperature;
    a laser emission means to radiate a first data modulated laser beam of power sufficient to heat a first region of the medium to a temperature less than the Curie temperature and greater than the compensation temperature, such that the first region has a magnetization aligned in the direction of the demagnetization field and opposite to that of the external magnetic filed, and for radiating a second data modulated laser beam sufficient to heat a second region of the medium to a temperature greater than the Curie temperature such that said first region has a magnetization aligned in the direction of the external magnetic field and opposite to that of the demagnetization field;
    means for switching the laser emission means the first and second laser beams responsive to binary information to be recorded; and
    means for moving said medium relative to said means of laser emission.

10. An apparatus in accordance with claim 9, wherein the Curie temperature equals or exceeds 300° C.

11. An apparatus in accordance with claim 9, wherein said medium is a RE-TM film whose coercive force drops to approximately 50 Oe and below when heated to 200° C. and over.

12. An apparatus in accordance with claim 9, wherein said RE-TM film is a TM-rich RE-TM film.

13. An apparatus in accordance with claim 9, wherein said RE-TM film is a RE-rich RE-TM film.

14. An apparatus in accordance with claim 9, wherein said medium is a single layer film.

15. An apparatus in accordance with claim 9, wherein said laser emission means comprises a single laser power source.

16. An apparatus in accordance with claim 9, wherein the recording medium is initially magnetized in a first direction.

* * * * *